F. K. LANDGRAF.
TOOL FOR APPLYING STAYBOLT SLEEVES TO BOILERS.
APPLICATION FILED MAY 3, 1920.
1,401,611. Patented Dec. 27, 1921.
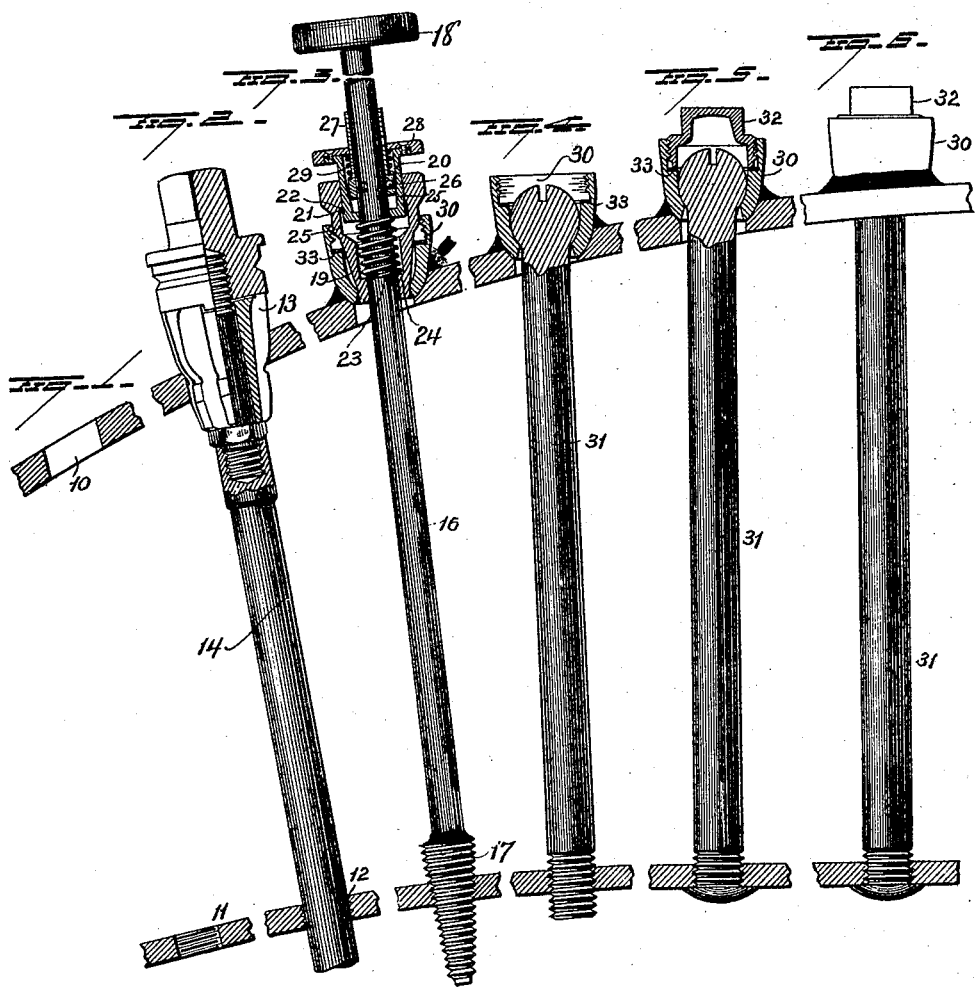

UNITED STATES PATENT OFFICE.

FREDERICK K. LANDGRAF, OF PITTSBURGH, PENNSYLVANIA, ASSIGNOR TO FLANNERY BOLT COMPANY, OF PITTSBURGH, PENNSYLVANIA.

TOOL FOR APPLYING STAYBOLT-SLEEVES TO BOILERS.

1,401,611.     Specification of Letters Patent.     Patented Dec. 27, 1921.

Application filed May 3, 1920. Serial No. 378,531.

*To all whom it may concern:*

Be it known that I, FREDERICK K. LANDGRAF, a citizen of the United States, and a resident of Pittsburgh, in the county of Allegheny and State of Pennsylvania, have invented certain new and useful Improvements in Tools for Applying Staybolt-Sleeves to Boilers; and I do hereby declare the following to be a full, clear, and exact description of the invention, such as will enable others skilled in the art to which it appertains to make and use the same.

My invention relates to an improvement in a tool for applying stay bolt sleeves to boilers.

In my Patent No. 1,352,285 granted Sept. 7th, 1920, I have claimed broadly the method of applying and securing stay bolt sleeves to the outer sheet by passing a rod or its equivalent through the sleeve and both sheets and carrying means for holding the sleeve while it is being welded to the sheet, and this application is designed as an improvement on the means for applying and holding the sleeve securely in place while welding or otherwise securing it in place.

In assembling the parts the sleeve should be placed with its long axis parallel with the long axis of the bolt that is to be seated therein so that the latter will have equal clearance all around at the inner end of the sleeve and in the reamed part of the hole in the outer sheet, but it is an extremely difficult operation to so seat the sleeve and hold it while welding it to the sheet and the object of my invention is to overcome this difficulty and render the correct assemblage of the sleeve to the outer sheet comparatively easy, and with the positive assurance that the sleeve will be in the proper relative position to the bolt when the latter is applied.

In the accompanying drawings; Figure 1 shows the outer sheet punched or drilled; Fig. 2 shows it reamed and recessed and the reaming and recessing tool in place; Fig. 3 shows the sleeve held in place during the welding; Fig. 4 shows the bolt applied; Fig. 5 shows the cap in place and Fig. 6 a view in elevation of the completed installation.

In applying the bolts, the outer sheet is punched or drilled as at 10 at the proper points for the bolts, and the inner sheet 11 has a threaded hole 12 for each bolt. After the holes in the outer sheet have been punched or drilled they are reamed and recessed by a tool 13 such as is shown in Fig. 2, having a smooth cylindrical stem 14 adapted to pass through the openings in both sheets and this stem carries the reaming and recessing tool 13 and holds it in proper position with relation to the hole 10 in the outer sheet, so that when finished the recess will properly support the stay bolt sleeve 30 with its long axis parallel to the long axis of the bolt 31 to be inserted in the sleeve. After the hole has been reamed and recessed by a tool 13 having the same external dimension and curvature as the inner end of the sleeve 30, the latter is applied, centered and held in proper position by my improved apparatus which is shown in longitudinal section in Fig. 3. The apparatus comprises a bar 16 of a length sufficient to pass through both sheets of the boiler and provided at its inner end with the extension 17 preferably made of steel and tapered and threaded so as to engage a tapped hole 12 of any size within the limits of its extreme diameters, and it is preferably hardened to enable it to firmly engage with the walls of a hole which for any reason may not be tapped. At the opposite end of the bar 16 is affixed a knurled knob 18 by which the bar may be turned to secure it in and remove it from its position in the sheets.

Mounted to slide longitudinally on the bar 16 is the centralizer or holding tool 19. This tool is in the form of a truncated cone with an opening through the same for the passage of the bar 16, the opening at the lower end being of a size to closely embrace the bar 16 but permit of free sliding movements thereon and it is counterbored as shown above said lower end to receive the parts to be hereinafter described, the exterior contour of the centralizer 19 being such that it will adapt itself to the interior contour of any and all the stay bolt sleeves with which it is to be used.

Mounted for longitudinal movement in the upper and largest bore of the centralizer 19 is the thimble 20 which projects above the centralizer and which is held from complete separation therefrom by the expansion ring or wire 21 which is seated in a groove in the outer cylindrical face of the thimble adjacent the lower end of the latter and is adapted to engage the annular shoulder 22 in the bore of the centralizer, there being sufficient space between the lower end of the ring and the annular shoulder 23 in the centralizer to permit of the necessary movement of the thimble within the centralizer. The thimble 20 is yieldingly held in its highest position or the position shown in Fig. 3, by the coiled spring 23 located within the centralizer and bearing at one end against the annular shoulder 24 and at its other end against the bottom of the thimble. The thimble is hollow and is provided at its lower end with an opening for the free passage of the bar 16, and the lower portion of its bore is provided with inclined or tapering wall 25 to be engaged by the hardened steel balls 26 carried in open pockets in the lower end of the sleeve 27. There are preferably three of such balls 26 equally spaced around the circumference of the sleeve and seated in open pockets formed in the lower enlarged end of said sleeve so that the balls may bear against the inner inclined face of the thimble and the outer cylindrical face of the bar 16. The upper end of the thimble 20 is closed by the cap 28 secured by screws to the outwardly projecting flange of the thimble, and the cap is provided with an opening for the passage and free movement of the sleeve 27 which as before explained is mounted on the bar 16 with its lower end within the thimble, and is yieldingly held in its lowest position within the thimble by the spring 29 which embraces the sleeve and bears at one end against the cap 28 and at its other end against the shoulder formed by the enlargement of the lower end of the sleeve.

In the operation of the tool, the stay bolt sleeve 30 is passed over the end 17 of the bar, and the latter is then passed through both sheets of the boiler and secured to the inner sheet as shown in Fig. 3, after which the stay bolt sleeve is moved on the bar until it is firmly and properly seated against the outer sheet. After the sleeve has been seated the centralizer is moved down on the bar (by pressing down on the cap 28) into the sleeve 30 and operates to hold the latter solidly in position. The centralizer and its attached parts are free to be moved downwardly on the bar, but are prevented from moving in the opposite direction by the frictional contact of the balls 26 with the bar 16 and inclined wall of the thimble, and by the springs 23 and 29. the latter of which by the clutch action of the balls 26 prevents outward or upward movement of the thimble 20 and the latter yieldingly holds the centralizer against the sleeve 30. It will therefore be seen that when the parts are thus applied the centralizer yieldingly holds the sleeve 30 solidly to its seat in the outer sheet but is capable of being moved so as to properly adjust the latter and when the latter has been adjusted with relation to the outer sheet it will be so held against the possibility of accidental displacement. After the sleeve 30 has been secured to the sheet by welding or otherwise a slight turn of the bar 16 releases the threaded end 17 thereof from the inner sheet, and permits the tool to be withdrawn.

To move the centralizer and its attached parts along the bar 16 toward the knob 18, the exposed end of the sleeve 27 which is knurled to prevent slipping, is pulled upwardly or toward the knob which releases the clutch action of the balls 26 and permits the centralizer and its attached parts to be moved toward the knob 18. With this arrangement the bar 16 can be of sufficient length to provide for varying distances between the two sheets and it will be apparent that when the tool is applied to the boiler sheets the sleeve 30 will be positioned and held with its long axis parallel with the long axis of the bar 16 and also with the bolt 31 to be inserted in the sleeve 30 after the latter has been secured to the sheet. After the completion of the welding or other operation by which the sleeve 30 is secured to the outer sheet, the tool is removed and the bolt 31 applied and secured as shown in Figs. 5 and 6. The sleeve is closed by a cap 32, which with the gasket 33 on which the cap bears forms a steam tight sleeve joint.

By the use of the tool above described there is no uncertainty whatsoever as to the correct position of the sleeve 30 as the latter automatically seats itself in the recess in the outer sheet and is so held until fully secured to the latter.

Having fully described my invention what I claim as new and desire to secure by Letters-Patent is:—

1. In a tool for applying stay bolt sleeves to boiler sheets and holding the sleeves while they are welded or otherwise secured to the outer sheet, the combination of a bar adapted to pass through two sheets of a boiler, a centralizer mounted to slide on said bar and adapted to engage the stay bolt sleeve, and means within the centralizer for locking the latter at any point on the bar.

2. In a tool for applying stay bolt sleeves to boiler sheets and for holding the sleeves while they are being welded or otherwise secured to the outer sheet, the combination of a bar adapted to pass through two sheets of a boiler, a centralizer mounted to slide on said bar and adapted to engage the stay bolt sleeve and friction means within the centralizer for locking the latter against outward displacement.

3. In a tool for applying stay bolt sleeves to boiler sheets and holding the sleeves while they are being welded or otherwise secured to the outer sheet, the combination of a bar adapted to be secured in proper position relative to the two sheets of the boiler, a centralizer mounted to slide on said bar and adapted to engage the stay bolt sleeve, friction locking means on said bar and a spring interposed between said locking means and the centralizer for yieldingly holding the latter against the sleeve.

4. In a tool for applying stay bolt sleeves to boiler sheets for positioning and holding the sleeves while they are being welded or otherwise secured to the outer sheet, the combination of a bar having means to engage the inner sheet, a centralizer mounted to slide on the said bar, friction locking device carried by said centralizer and a spring interposed between said friction locking device and the centralizer.

5. The combination of a bar adapted to be passed through a hole in the outer sheet of a boiler and be fastened to the inner sheet, means slidably mounted on said bar to engage and temporarily hold a stay bolt sleeve in position on the outer sheet, and means for locking said holding means in place.

6. The combination of a bar adapted to be passed through a hole in the outer sheet of a boiler and be locked to the inner sheet, means mounted to slide on said bar and engage a stay bolt sleeve resting on the outer sheet and friction means carried by said engaging means for locking the latter against accidental outward movement.

7. The combination of a bar adapted to be passed through a hole in the outer sheet of a boiler and engage the inner sheet, means mounted to slide on said bar and engage a stay bolt sleeve resting on the outer sheet, means for locking said engaging means to the bar and a spring interposed between said locking means and engaging means for yieldingly holding the latter in contact with said sleeve.

8. The combination of a bar adapted to be passed through a hole in the outer sheet of a boiler and engage the inner sheet, means mounted to slide on said bar and engage a stay bolt sleeve resting on the outer sheet, means carried by said engaging means for locking the latter in place and a spring interposed between said engaging means and locking means whereby the former will be yieldingly held against the sleeve.

9. The combination of a bar having a tapered threaded end, a stay bolt sleeve holding device mounted to slide on said bar and means for locking the latter in place.

10. The combination of a bar having a tapered threaded end, a stay bolt sleeve holding device mounted to slide on said bar, a thimble carried by said holding device, means for locking the thimble against outward movement and a spring interposed between the thimble and holding device and forming a yielding backing for the latter.

11. The combination of a bar having a tapered threaded end, a stay bolt sleeve holding device mounted to slide on said bar, a thimble carried by said holding device, friction means for locking the thimble against outward movemnet and a spring interposed between the thimble and holding device and forming a yielding backing for the latter.

12. The combination of a bar having a tapered threaded end, a stay bolt sleeve holding device mounted to slide on said bar, a thimble carried by said holding device, a spring interposed between said thimble and holding device and friction means for preventing accidental outward movement of said thimble.

13. The combination of a bar having a tapered threaded end, a stay bolt sleeve holding device mounted on said bar, a thimble carried by said holding device, a spring interposed between the thimble and holding device and a spring actuated sleeve carried by the thimble and provided with friction means adapted to engage the outer surface of the bar for locking the thimble against outward movement.

14. The combination of a bar having a tapered threaded end, a stay bolt sleeve holding device mounted to slide on said bar, a thimble carried by said holding device, a spring interposed between the thimble and holding device, the inner face of the thimble being inclined, and a spring pressed sleeve within the thimble and carrying friction balls adapted to engage the outer face of the bar and the inner inclined face of the thimble for temporarily locking the latter against outward displacement.

In testimony whereof, I have signed this specification in the presence of two subscribing witnesses.

FREDERICK K. LANDGRAF.

Witnesses:
  H. M. Schadel,
  R. B. Retzer.